United States Patent [19]

Kirchner

[11] 4,079,923
[45] Mar. 21, 1978

[54] VEHICLE SUSPENSION EMPLOYING A LIQUID SPRING

[75] Inventor: Harold G. Kirchner, Issaquah, Wash.

[73] Assignee: The United States of America as represented by the Secretary of the Army, Washington, D.C.

[21] Appl. No.: 723,836

[22] Filed: Sep. 16, 1976

[51] Int. Cl.² .......................................... B60G 11/64
[52] U.S. Cl. ................................. 267/65 D; 280/705
[58] Field of Search ........................... 267/65 D, 65 R; 280/702, 705, 709; 137/596

[56] References Cited

U.S. PATENT DOCUMENTS 3,797,140 3/1974 McWilliams ...................... 267/65 D
3,923,240 12/1975 Glaze ................................. 267/65 D Primary Examiner—James B. Marbert
Attorney, Agent, or Firm—Peter A. Taucher; John E. McRae; Nathan Edelberg

[57] ABSTRACT

A vehicle suspension wherein a compressible liquid such as Dimethyl Polysiloxane is compressed during jounce periods to absorb road energy, and wherein the liquid expands during rebound to maintain suspension action. Special features include non-linear spring rate and acceleration-controlled variable damping. Thermal expansion effects in the closed liquid spring system are alleviated by means of a special compensator valve that vents excess liquid to an accumulator only when the spring approaches its full rebound position.

3 Claims, 2 Drawing Figures

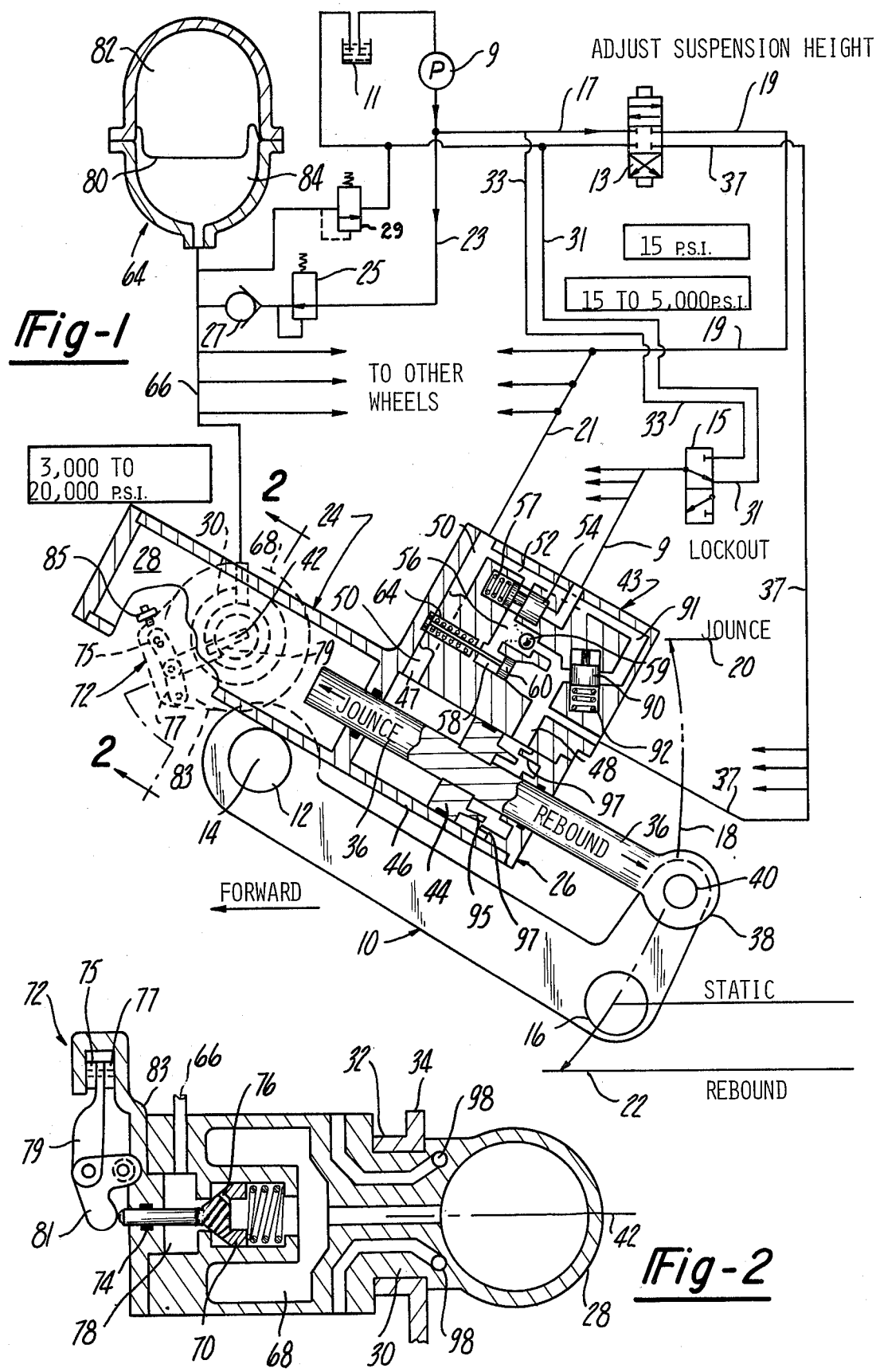

VEHICLE SUSPENSION EMPLOYING A LIQUID SPRING

The invention described herein may be manufactured, used, and licensed by or for the Government for governmental purposes without payment to me of any royalty thereon.

BACKGROUND AND SUMMARY OF THE INVENTION

U.S. Pat. No. 3,342,474 issued to K. Bittel on Sept. 19, 1967 discloses a liquid spring having a body of compressible liquid trapped within a piston-cylinder assembly. Such a spring is attractive for vehicle suspension because a relatively small quantity of compressible liquid is able to absorb large amounts of energy. A suitably designed suspension using a liquid spring can provide relatively high road wheel travel on the order of 18 inches.

One problem when using liquid springs is the thermal expansion due to ambient temperature variations and damping heat generated by road wheel travel. The present invention suggests a compensator valve which vents excess liquid to a pressurized accumulator when the road arm approaches the full rebound position. The accumulator pressure determines the rebound pressure setting of the liquid spring.

The present invention also suggests a damper for the liquid spring, comprising a damper piston and a two-way passage means from one face of the damper piston to the other face. During movement of the road wheel in the jounce direction the damper liquid flow rate is restricted to thereby control road wheel acceleration. When the wheel is pushed upward toward the vehicle the damping is controlled by an acceleration sensing bypass valve which can cause the damping to be eliminated when the wheel is impacted suddenly. When the vehicle is moving downward with the wheel moving only in the horizontal direction the acceleration sensing bypass valve cannot eliminate the damping. Thus damping force is not applied to the vehicle upon sharp impacts of the wheel and the vehicle motion is still damped after hitting a bump. During rebound movement the damper liquid flow is relatively unthrottled to permit rapid wheel travel, and to maintain the suspension effect.

THE DRAWINGS

FIG. 1 illustrates in a schematic fashion a vehicle suspension incorporating this invention.

FIG. 2 is a sectional view taken substantially along line 2—2 in FIG. 1.

GENERAL ARRANGEMENT

FIG. 1 shows the suspension at one of the road wheels. Similar suspension mechanisms would be provided at the other road wheels. The number of road wheels is naturally related to the size and purpose of the vehicle. In larger vehicles such as trucks, trailers and tracked vehicles (military and civilian) a relatively large number of road wheels are required; smaller vehicles such as passenger automobiles require fewer road wheels.

Each suspension device comprises a liquid spring and damper mechanism trained between the sprung mass (hull) and the road wheel. A pump 9 originally delivers suspension liquid from a tank 11 to each damper through a line 17 and valve 13; during normal operations valve 13 is closed to isolate the damper from the liquid supply. Pump 9 also supplies liquid to each liquid spring through line 23 and check valve 27. Valve 27 normally isolates each liquid spring from the supply pressure. During normal vehicle-run operations each spring-damper assembly functions essentially as a closed system. The internal liquid pressure in each spring absorbs road energy during jounce periods. During such periods the low spring rate portion of the non-linear spring and an acceleration-sensing damper bypass valve cushions the hull against road shocks; the damper absorbs energy to control pitching and heaving of the vehicle. During rebound movements the damper offers decreased dashpot action so that the spring moves at a relatively high rate to maintain the hull suspension effect.

When desired, charging valve 13 can be operated to admit or withdraw pressurized liquid into or out of each suspension unit, thereby raising or lowering the hull relative to ground level. Such raising-lowering adjustments may be advantageous for example in raising or lowering the silhouette of a military vehicle to permit increased visibility, greater road clearance, or smaller enemy target area.

At times it may be desirable to lockout the cushioned suspension action; for example, when firing a heavy gun it may be advantageous to stabilize the vehicle into a rigid gun-support platform. The illustrated system includes a lockout valve 15 for rigidifying each suspension into a relatively solid connection between the hull and associated road wheel. During normal vehicle-run operations the lockout valve would be inactive.

FIG. 1 illustrates one road arm 10 having a spindle or shaft 12 mounted on the hull of the vehicle for enabling the road arm to rotate around a spindle axis 14. The trailing end of the road arm carries an axle 16 for the road wheel, not shown. In its illustrated position the road arm is located with the vehicle in a static, non-moving condition. As the road wheel encounters a bump or terrain elevation axle 16 moves upwardly along path 18 to the full jounce position 20. As the road wheel encounters a depression in the terrain the axle 16 moves toward the full rebound position 22.

LIQUID SPRING

The hull (sprung mass) is suspended by means of a liquid spring 24 and liquid damper 26. The liquid spring is shown as a closed cylinder 28 having a cylindrical extension 30 rotatably journaled in a bearing 32 carried by the hull side wall 34. The liquid spring further comprises a rod 36 having an enlarged trailing end 38 pivotally connected to the road arm 10 by means of a pivot pin 40. Cylinder 28 is filled with a compressible liquid such as Dimethyl Polysiloxane obtainable from General Electric Company under its designation SF-96; this liquid has a viscosity of 100 centistokes at 77° F.

During upward movement of road arm 10 in the jounce direction pivot 40 moves toward the pivot axis 42 defined by bearing 32; therefore rod 36 penetrates further into cylinder 28 to compress the liquid therein. The liquid thereby absorbs road energy while suspending the hull. During downward movement of road arm 10 toward the full rebound position the rod 36 is extended from the cylinder by the cylinder liquid; hull suspension is maintained by the pressurized liquid.

SPRING VOLUME COMPENSATION

During reciprocatory movement of rod 36 the temperature of the spring liquid varies due to friction and ambient temperature changes. The liquid expansion is compensated by a vent system that includes a pressurized accumulator 64 connected to the liquid spring via a liquid line 66 and reservoir 68 (FIG. 2). Check valve 70 normally prevents liquid flow from reservoir 68 to line 66. However, when the road arm 10 is lowered to its full rebound position 22 a linkage 72 is actuated to move the valve 70 plunger 74 to the right, thereby permitting liquid to flow from reservoir 68 through valve ports 76 into a chamber 78 communicating with line 66.

Accumulator 64 includes a partition or diaphragm 80 which subdivides the accumulator into a pressurized gas chamber 82 and liquid chamber 84. The pressure within chamber 82 establishes the rebound pressure within the liquid spring cylinder 28; the gas pressure forces diaphram 80 downward to pump liquid through line 66, into chamber 78, past valve 70, into reservoir 68, and then into cylinder 28. Valve 70 normally prevents reverse flow from reservoir 68 into chamber 78. However as road arm 10 approaches the full rebound position 22 linkage 72 is actuated to force plunger 74 to move valve 70 to the right (FIG. 2) thereby equalizing the pressure between accumulator space 84 and liquid spring cylinder 28.

Linkage 72 includes two links 75 and 77 attached to a plate 83 carried by reservoir 68. The overlapped ends of links 75 and 77 are pivotally connected to a thrust element 79 that is in turn pivotally connected to a bell crank 81; the bell crank is suitably pivoted on the guide plate 83 for plunger 74.

As road arm 10 approaches rebound position 22 link 75 strikes a fixed abutment 85 carried by the hull, thereby partially buckling links 75 and 77. Bell crank 81 moves plunger 74 to open valve 70. A slot in link 75 permits buckle action.

DAMPER MECHANISM

In this suspension system the movement of rod 36 during jounce periods is preferably less rapid than during the rebound period. The differential in speed is obtained by a damper means 26 that comprises a piston 44 carried on rod 36. The piston slidably moves within a cylinder 46 whose opposite ends are connected by a two way passage system extending within a manifold block 43 between ports 47 and 48.

The passage system includes a duct 50 leading from port 47 to a second duct 52 that communicates with a spool valve 54. Another duct 56 leads from valve 54 to a cylindrical chamber 58 having a flared area communicating with port 48. Liquid flowing from duct 56 into chamber 58 exerts a pressure on slidable plunger 60, thereby forcing the plunger 60 into the flared portion of chamber 58; the liquid flow is thereby progressively increased as the liquid pressure in duct 56 is increased. The actual flow would be a function of the chamber 58 contour and rate of opposing spring 64.

During jounce movement of main damper piston 44 toward port 47 damper liquid flows through a path comprising port 47, ducts 50 and 52, spool valve 54, duct 56, chamber 58, plunger 60, and port 48. During rebound movement of piston 44 toward port 48 the damper liquid flows through an unthrottled path comprising port 48, check valve 59, duct 56, valve 54, ducts 52 and 50, and port 47.

DASHPOT BYPASS

During relatively high rate accelerations of road arm 10 in the jounce direction the dashpot throttling by plunger 60 may cause the suspension to transmit sharp bumps to the hull. Therefore the illustrated system includes an acceleration-responsive valve 90 arranged in a bypass duct 91. One end of duct 91 communicates with duct 52; the other end of duct 91 communicates with port 48. The slide axis of a valve piston 90 is tangent to an imaginary radius line taken from pivot axis 42. As road arm 10 accelerates upward in the jounce direction the mass of piston 90 will provide inertia force so that piston 90 moves downward relative to manifold 43, thereby opening bypass 91.

During low acceleration periods a spring 92 maintains the floating piston 90 in its closed position. The piston flows liquid only during high acceleration periods. The bypass passage 91 never opens during the rebound travel since spring 92 keeps it in a closed position at that time.

There is some possibility of shock effect when the piston 44 approaches its lower travel limit (full rebound position). To obviate such shock effects the piston may be provided with a tapered flange 95 arranged to pass closely alongside an upstanding rim 97 projecting from the end wall of damper cylinder 46. Liquid is partially trapped within annular flange 95; liquid escape to port 48 is throttled by the close spacing between rim 97 and flange 95, thereby providing a cushion stop as the piston reaches the full rebound position.

INITIAL SYSTEM CHARGING

Initially the charging valve 13 is in a lowered position wherein high pressure liquid in line 17 flows through valve 13 into line 19 and branch line 21, thereby charging the passages in manifold 43 and the chambers defined by piston 44. At the same time high pressure liquid from pump 9 flows through line 23, pressure regulating valve 25 and check valve 27, to thereby charge accumulator chamber 84, line 66, reservoir 68, and spring cylinder 28. A relief valve 29 is incorporated in the charging system to relieve overpressure at full rebound position caused by expansion of the spring liquid.

SUSPENSION LOCKOUT

During normal run periods valve 15 is in its illustrated position wherein line 9 connects with a drain line 31 leading back to the tank 11. Accordingly spool valve 54 is urged by spring 57 to the position shown in the drawing. However, when valve 15 is moved upwardly so that line 9 communicates with high pressure line 33 the increased hydraulic pressure on the right end face of spool 54 moves the spool to a position stopping flow between ducts 52 and 56. The pressurized liquid cannot then be transferred from one face of piston 44 to the other face; therefore rod 36 and the two cylinders 28 and 46 act essentially as a solid connection between the hull and pin 40. The suspension is therefore substantially locked out.

VEHICLE HEIGHT ADJUSTMENT

To raise the vehicle, static height position valve 13 is operated downwardly. Pressurized liquid from line 17 flows through valve 13 and lines 19 and 21 to pressurize the chamber above piston 44, thereby extending the hull upwardly. Valve 13 is moved to its illustrated position during normal run operations of the vehicle. To lower the vehicle hull, position valve 13 is moved upwardly so that line 17 communicates with line 37. Pressurized liquid thereby enters port 48 to pressurize the space below piston 44, thereby lowering the vehicle hull position.

The drawings show various lines 21, 37 and 9 connected to manifold 43 at points remote from pivot axis 42. In actual practice such locations of lines 21, 37 and 9 might contribute to undesired flexing of the lines because manifold 43 moves a considerable distance during road wheel travel. Therefore the various lines are preferably connected to the suspension unit at a point near pivot axis 42. The manifold can be extended along side cylinder 28 to provide internal longitudinal passages as shown at 98 in FIG. 2. The external liquid lines 21, 37 and 9 can be connected to such internal passageways near pivot axis 42, thereby minimizing undesired flexure of the lines.

ADVANTAGES OF THE SYSTEM

This suspension permits fast unthrottled flow of damper liquid in the rebound direction and variably throttled flow in the jounce direction. Advantageously this action produces cushioning without tendency of the road wheels to become airborne or otherwise have reduced suspension effect. Acceleration-responsive valve 90 modifies the jounce action in that acceleration-producing bumps produce high liquid flow through bypass 91; sharp bumps thereby do not pass through the suspension to the hull.

A principal feature of this invention is the automatic venting of pressurized liquid from spring cylinder 28 to alleviate thermal expansion effects. The venting is controlled so that accumulator 64 absorbs excess pressure; the relief valve 29 is optional. During non-venting periods valve 70 maintains the liquid spring in a fully-sealed condition suitable for absorbing road energy.

I wish it to be understood that I do not desire to be limited to the exact details of construction shown and described for obvious modifications will occur to a person skilled in the art.

I claim:

1. A vehicle suspension comprising in combination:
    a liquid spring (24) trained between the sprung mass and unsprung mass to receive shock energy from the road during jounce movement and to return energy to the unsprung mass during rebound periods, said spring including a rod-cylinder assembly (36, 28) completely filled with a compressible liquid so that liquid pressure tends to increase the assembly length, thereby moving the spring in the rebound direction;
    a pressurized accumulator (64) communicating with the cylinder (28) to maintain the liquid at a predetermined rebound pressure;
    check valve means (70) normally permitting liquid flow from the accumulator to the cylinder while preventing reverse liquid flow from the cylinder to the accumulator;
    compensator means (at 81, 79, 75, 85) controlled by reciprocatory motion of the liquid spring for opening an expansion flow path from the cylinder (28) to the accumulator only when the spring approaches its full rebound position, whereby the liquid pressure within the spring is substantially unaffected by thermal expansion of the liquid;
    and damper means (26) for controlling the speed of the rod into and out of the cylinder; said damper means including a piston (44) carried by the rod, and two way passage means for transferring damper liquid from one face of the piston to the other face; said two way passage means including a check valve (59) permitting unrestricted liquid flow thereacross when the rod is moving in the rebound direction while preventing liquid flow thereacross when the rod is moving in the jounce direction, said two way passage means also including a pressure-responsive valve (60) permitting restricted flow thereacross when the rod is moving in the jounce direction while preventing liquid flow thereacross when the rod is moving in the rebound direction; said check valve and pressure-responsive valve being arranged in parallel flow paths between opposite faces of the damper piston for effective flow control during the rebound and jounce periods, respectively.

2. The vehicle suspension of claim 1: said damper means further comprising a normally-closed slide valve (90) arranged in a bypass passage (91) connecting the opposite faces of the damper piston; said slide valve being arranged on a slide axis that permits the valve to automatically open said bypass passage (91) when the suspension acceleration rate exceeds a predetermined value in the jounce direction.

3. The vehicle suspension of claim 1: said damper means further comprising a normally-open suspension lock-out valve (54) functionally interposed between one face of the damper piston (44) and the aforementioned valves (59) and (60); said lock-out valve having a hydraulically-pressurizable actuator face adapted to connect with a hydraulic pressure source for moving the lock-out valve to a position blocking flow between said one piston face and the aforementioned valves (59) and (60).

* * * * *